United States Patent
Bajpai

(10) Patent No.: US 8,744,451 B2
(45) Date of Patent: Jun. 3, 2014

(54) DELAYED ACK IN DUAL-MODE CALL HANDOVER

(75) Inventor: Rajneesh Bajpai, San Jose, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 1059 days.

(21) Appl. No.: 11/955,108

(22) Filed: Dec. 12, 2007

(65) Prior Publication Data
US 2009/0156217 A1 Jun. 18, 2009

(51) Int. Cl.
*H04W 36/00* (2009.01)

(52) U.S. Cl.
USPC ........... 455/443; 455/436; 455/437; 455/438; 455/442; 455/444

(58) Field of Classification Search
CPC .................................... H04W 36/023
USPC ............... 455/436–444; 370/328–331
See application file for complete search history.

(56) References Cited

U.S. PATENT DOCUMENTS

| | | | |
|---|---|---|---|
| 6,445,921 B1 | 9/2002 | Bell | |
| 6,614,786 B1 | 9/2003 | Byers | |
| 6,975,602 B2 | 12/2005 | Anderson | |
| 7,035,260 B1 | 4/2006 | Betta | |
| 7,231,205 B2 | 6/2007 | Guyot et al. | |
| 7,308,263 B2 * | 12/2007 | Gallagher et al. | 455/439 |
| 7,414,992 B2 | 8/2008 | Hirsbrunner et al. | |
| 7,492,872 B1 | 2/2009 | Di Carlo et al. | |
| 7,565,145 B2 * | 7/2009 | Gallagher et al. | 455/436 |
| 7,606,190 B2 * | 10/2009 | Markovic et al. | 370/328 |
| 7,630,724 B2 | 12/2009 | Beyer, Jr. et al. | |
| 7,768,977 B2 * | 8/2010 | Camp, Jr. | 370/332 |
| 7,826,868 B2 | 11/2010 | Robbins | |
| 8,326,276 B2 | 12/2012 | Chin et al. | |
| 2002/0111198 A1 | 8/2002 | Heie | |
| 2002/0132638 A1 | 9/2002 | Plahte et al. | |
| 2003/0139180 A1 | 7/2003 | McIntosh et al. | |
| 2004/0033811 A1 | 2/2004 | Tsai et al. | |
| 2004/0264410 A1 | 12/2004 | Sagi et al. | |
| 2005/0078612 A1 | 4/2005 | Lang | |
| 2006/0023658 A1 | 2/2006 | Phillips et al. | |
| 2006/0058050 A1 | 3/2006 | Park | |
| 2006/0121902 A1 | 6/2006 | Jagadeesan et al. | |
| 2006/0223555 A1 | 10/2006 | Kim | |
| 2006/0239277 A1 | 10/2006 | Gallagher | |

(Continued)

OTHER PUBLICATIONS

United States Office Action dated Jun. 17, 2010 for U.S. Appl. No. 11/955,104, filed on Dec. 12, 2007 entitled Single Number Presentation for Dual-Mode Phones.

(Continued)

*Primary Examiner* — Huy C Ho
(74) *Attorney, Agent, or Firm* — Varun A. Shah

(57) ABSTRACT

Handover of a call to a dual-mode phone from cellular to Wi-Fi. When handing over a call mediated by a mobility controller to a dual-mode phone and switching the call from a cellular to a Wi-Fi call, the mobility controller initiates a Wi-Fi connection to the dual mode phone. When the Wi-Fi connection is established, and with the cellular connection through the mobility controller still in place, the mobility controller starts a timer with a predetermined value and the dual-mode phone initiates release of the cellular connection. When the timer expires, the mobility controller switches the call from the cellular connection to the Wi-Fi connection.

20 Claims, 1 Drawing Sheet

(56) References Cited

U.S. PATENT DOCUMENTS

| | | |
|---|---|---|
| 2007/0014260 A1 | 1/2007 | Seo |
| 2007/0149176 A1 | 6/2007 | Wells et al. |
| 2007/0165825 A1 | 7/2007 | Ko et al. |
| 2007/0207804 A1* | 9/2007 | Sharma et al. ............... 455/436 |
| 2007/0268858 A1 | 11/2007 | Soto |
| 2007/0281682 A1 | 12/2007 | Raju et al. |
| 2008/0002605 A1 | 1/2008 | Todd et al. |
| 2008/0085728 A1 | 4/2008 | Reding et al. |
| 2008/0112392 A1 | 5/2008 | Mansfield |
| 2008/0139228 A1 | 6/2008 | Raffel et al. |
| 2010/0105379 A1 | 4/2010 | Bonner et al. |

OTHER PUBLICATIONS

H. Schulzrinne et al., "RTP Payload for DTMF Digits, Telephony Tones and Telephony Signals", Network Working Group, May 2000, 1-30.

R. Mahy et al., "A Message Summary and Message Waiting Indication Event Package for the Session Initiation Protocol (SIP)", Network Working Group, Aug. 2004, 1-19.

S. Bellovin et al., "Security Mechanisms for the Internet", Network Working Group, Dec. 2003, 1-20.

H. Schulzrinne et al., "RTP: A Transport Protocol for Real-Time Applications", Network Working Group, Jul. 2003, 1-89.

J. Rosenberg et al., "SIP: Session Initiation Protocol", Network Working Group, Jun. 2002, 1-269.

United States Office Action dated Oct. 5, 2010 for U.S. Appl. No. 11/955,091, filed on Dec. 12, 2007 entitled Single Voicemail for Dual-Mode Phones.

United States Office Action dated Dec. 6, 2010 for U.S. Appl. No. 11/955,104, filed on Dec. 12, 2007 entitled Single Number Presentation for Dual-Mode Phones.

United States Office Action dated Nov. 15, 2010 for U.S. Appl. No. 11/963,275, filed on Dec. 12, 2007 entitled Indicators for Dual-Mode Phones.

U.S. Appl. No. 11/963,275, Final Office Action, mailed Jul. 6, 2012.

U.S. Appl. No. 11/963,275, Non-Final Office Action, mailed Mar. 22, 2012.

U.S. Appl. No. 12/168,756, Final Office Action, mailed Jun. 12, 2013.

U.S. Appl. No. 12/168,756, Non-Final Office Action, mailed Nov. 26, 2012.

United States Office Action dated Apr. 26, 2011 for U.S. Appl. No. 11/963,275, filed on Dec. 12, 2007 entitled Indicators for Dual Mode Phones.

United States Office Action dated Mar. 29, 2011 for U.S. Appl. No. 11/955,091, filed on Dec. 12, 2007 entitled Single Voicemail for Dual-Mode Phones.

United States Office Action dated Mar. 2, 2011 for U.S. Appl. No. 12/168,756.

United States Office Action dated Nov. 22, 2011 for U.S. Appl. No. 12/168,756.

United States Office Action dated Sep. 29, 2011 for U.S. Appl. No. 13/191,324, filed on Jul. 26, 2011.

\* cited by examiner

DELAYED ACK IN DUAL-MODE CALL HANDOVER

CROSS REFERENCE TO RELATED APPLICATIONS

The present application is related to (1) U.S. patent application Ser. No. 11/955,104 filed Dec. 12, 2007 and entitled "Single Number Presentation for Dual-Mode Phones"; (2) U.S. patent application Ser. No. 11/963,275 filed Dec. 21, 2007 and entitled "Indicators for Dual-Mode Phones"; and (3) U.S. patent application Ser. No. 11/955,091 filed Dec. 12, 2007 and entitled "Single Voicemail for Dual-Mode Phones", all incorporated herein by reference.

BACKGROUND OF THE INVENTION

The present invention relates to call handover in dual-mode phones.

A dual-mode phone, also called an endpoint, can accept voice/video calls from a Wi-Fi network or a cellular network. In an ideal world, the user of the dual-mode phone should be able to transition seamlessly and transparently from the cellular network to the Wi-Fi network.

In the real world, the Wi-Fi connection for the dual-mode phone is managed by a mobility controller using well known SIP and RTP protocols. SIP (Session initiation protocol) is defined for example in RFC 3261 from the IETF SIP Working Group. SIP provides for call signaling and call setup for voice over IP (VoIP) devices. The actual voice and/or video packet streams usually operate under RTP (Real-time Transport Protocol) defined for example in IETF RFC 3550.

In operation, an endpoint such as a dual-mode phone can accept or originate calls on either a cellular network or a Wi-Fi network, When the mobile endpoint is on a call using the cellular network and moves into range of the Wi-Fi network, it is desirable to switch the call to the Wi-Fi network. Similarly, when the mobile endpoint is on a call using the Wi-Fi network and moves out of range of the Wi-Fi network, it is desirable to hand the call off to the cellular network. The problem is to manage these transitions minimizing delay, dropped packets, and duplications of packets during connection handover.

BRIEF DESCRIPTION OF THE DRAWINGS

The invention may be best understood by referring to the following description and accompanying drawings that are used to illustrate embodiments of the invention in which.

DETAILED DESCRIPTION

Embodiments of the invention relate to dual-mode phones, and more particularly, to call handover in dual-mode phones. In an embodiment of the invention, a controller when switching a dual-mode phone from a cellular call to a Wi-Fi connection, establishes the Wi-Fi connection with the dual-mode phone, starts a timer, and begins teardown of the cellular leg of the call. When the timer expires, the controller begins sending voice traffic over the Wi-Fi connection to the dual-mode phone.

Figure 1:
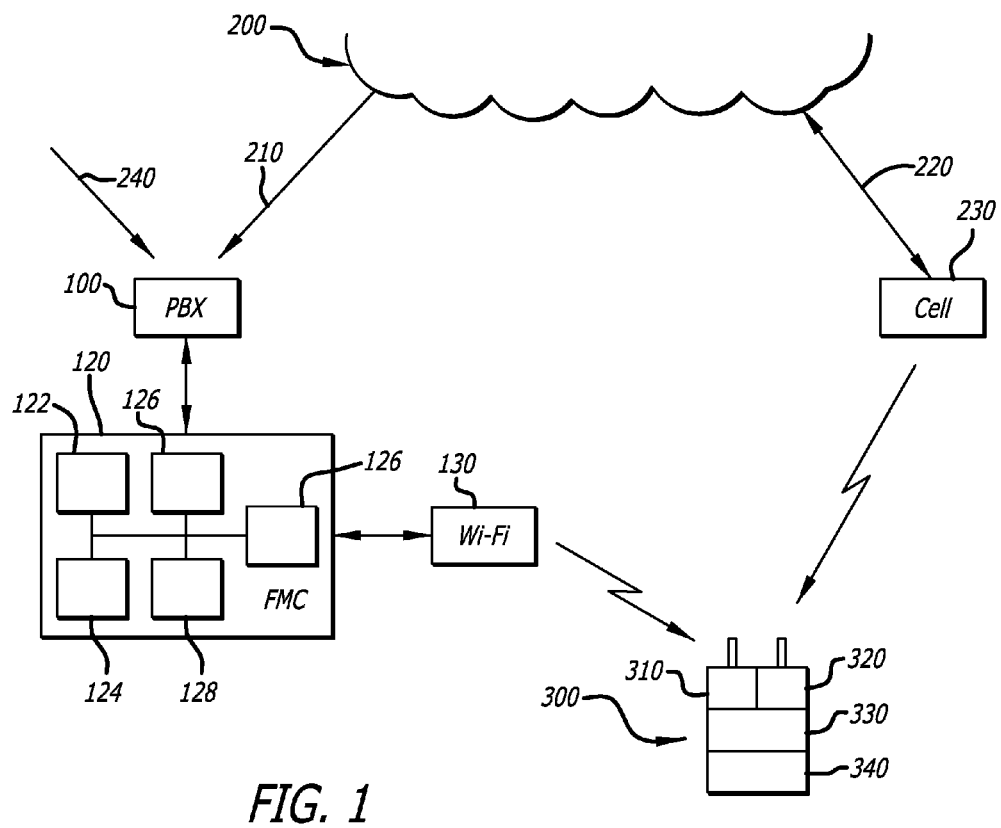
FIG. 1 shows a dual-mode phone in a network.

FIG. 1. shows an embodiment of the invention including a dual-mode phone. Enterprise SIP PBX communicates 210 with public switched telephone network (PSTN) 200. SIP PBX 100 also communicates with fixed mobility controller (FMC) 120. Mobility controller 120 bridges the worlds of SIP PBX 100 and Wi-Fi network controller 130. SIP PBX 100 and fixed mobility controller 120 communicate for example using protocols established by RFC 3261, RFC 2833, and RFC 3631, incorporated herein by reference. Voice streams are typically encoded using the RTP protocols defined by RFC 3550, incorporated herein by reference.

As understood in the art, such a hardware platform as shown in FIG. 1 for hosting mobility controller 120 includes a central processing unit (CPU) 122 connected to memory hierarchy 124, and to one or more interfaces 126. In one embodiment, CPU 122 is a MIPS-style CPU such as those from Raza Microelectronics or Cavium Networks, although CPUs from other companies such as Intel, AMD, Freescale, or the like may also be used. Memory hierarchy 124 includes read-only memory for system initialization, high-speed read-write memory such as DRAM, and bulk memory such as a hard disk or compact flash storage for files. Interfaces 126 include wired and wireless Ethernet interfaces as are known to the art. Controller 120 typically operates under the control of an operating system such as Linux, hosting software processes which provide device functionality. Additional hardware may be provided to provide for high-speed packet handling, crypto processing, and the like. While FIG. 1 shows mobility controller 120 and Wi-Fi-network controller 130 as separate entities, it should be noted that they may also be software processes running on a shared hardware platform. As an example, a single hardware platform based on a multi-core MIPS processor such as those from Raza Microelectronics or Cavium Networks could host the functions of Wi-Fi network controller 130 along with mobility controller 120 and additional functions such as intrusion detection and/or firewalls.

Dual-mode phone 300 has first radio subsystem 310 for Wi-Fi communications such as to Wi-Fi network controller 130. Dual-mode phone 300 also has second radio subsystem 320 for communicating with cellular network 230 and through public switched telephone network 200. As is common with many such devices, dual-mode phone 300 is a digital device operating under control of CPU 330 through programs and data stored in memory hierarchy 340. Other aspects of dual-mode phone 300 such as speakers, microphones, power and display, keyboards and the like are understood by those in the art, and are not shown.

In operation, dual-mode phone 300 may operate as a cellular phone, connecting to cellular network 230 and public switched telephone network 200 through second radio subsystem 320. Or, it may operate as a Wi-Fi phone, connecting to public switched telephone network 200 through controller 120 and SIP PBX 100.

During call handover, dual-mode phone 300 and mobility controller 120 must deal with two RTP voice streams, one from the cellular side, and the other on the Wi-Fi side. Envisioning these sides as buffers, the cellular side represents a longer, deeper buffer, with more voice data in transit. During call handover, which is mediated by controller 120, care should be taken to minimize cluttered and/or duplicated audio at dual-mode phone 300.

In both scenarios described herein according to the invention, one leg of call 240 comes in through SIP PBX 100. As an example, if a caller dials in to the enterprise, the call comes in 240 to SIP PBX 100. If the destination is dual-mode phone 300, call 240 is handled by controller 120, which routes the call to the Wi-Fi side of dual mode phone 300 if the phone is within Wi-Fi range, or to the cellular side of dual-mode phone 300 if the phone is not within Wi-Fi range.

Figure 2:
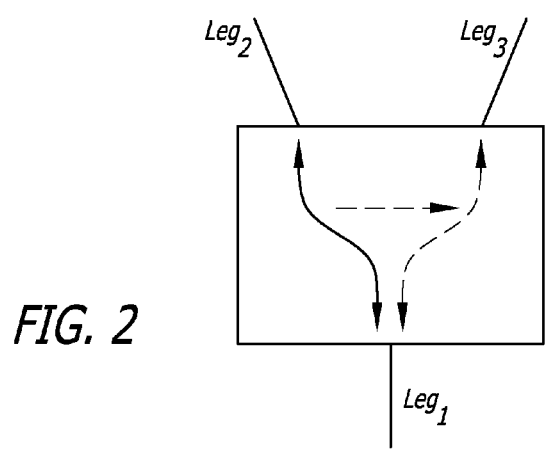
FIG. 2 shows a diagram of call switching.

Handover from Wi-Fi to Cellular. Assume dual-mode phone 300 is in a Wi-Fi call with another phone. Call 240 comes in through SIP PBX 100 through controller 120 and Wi-Fi network controller 130 to Wi-Fi radio subsystem 310. This is shown in FIG. 2 with call leg 2 representing the connection between controller 120 and the Wi-Fi side of dual-mode phone 300, and call leg 1 representing the PSTN connection between controller 120 and the incoming PSTN call 240 through SIP PBX 100. Assume that either dual-mode phone 300 or controller 120 sense that dual-mode phone 300 is moving out of Wi-Fi range, and initiate the handover process with controller 120. Controller 120 begins call setup on the cellular number associated with dual-mode phone 300 by sending INVITE to SIP PBX 100, which uses PSTN 200 to establish a call through cellular network 230 and cellular radio 320 in dual-mode phone 300. This new leg is shown as call leg 3.

When dual-mode phone 300 completes the cellular connection as call leg 3, the Wi-Fi connection is still present. Controller 120 receives SIP notification (2000K) from PBX 100 that the cellular leg has been completed. Controller 120 then switches the connection of FIG. 2 between call leg 1 and Wi-Fi call leg 2 to call leg 1 and cellular leg 3. This switching is performed, as is known to the art, by changing the network address translation (NAT) bindings associated with the RTP data streams for the call legs, directing RTP data from leg 1 to leg 3, and data from leg 3 to leg 1. The Wi-Fi connection may then be terminated; controller 120 sends back a SIP ACK message to PBX 100, and then disconnects Wi-Fi leg 2 of the connection by sending the SIP BYE message to the Wi-Fi side of dual-mode phone 300 through Wi-Fi controller 130.

Handover from Cellular to Wi-Fi. Assume dual-mode phone 300 is in a cellular call with another phone. Call 240 comes in through SIP PBX 100 through controller 120 (leg 1 of FIG. 2), back through SIP PBX 100 (leg 2), and connects 210 to PSTN 200, 220, to cellular network 230, through to cellular radio subsystem 310 of dual-mode phone 300. When dual-mode phone 300 moves in range of Wi-Fi network 130, controller 120 is notified, and initiates the transition of the call to the Wi-Fi network by initiating a Wi-Fi (SIP) connection through Wi-Fi controller 130 to dual-mode phone 300.

When a Wi-F SIP connection (leg 3 of FIG. 2) is established between dual-mode phone 300 and controller 120, controller 120 receives a SIP notification (2000K) from dual-mode phone 300. At this stage, both Wi-Fi and cellular connections are active to dual-mode phone 300. Once controller 120 receives the SIP 200 OK message from dual-mode phone through Wi-Fi controller 130, controller 120 starts the timer 128 for a predetermined period and starts the release procedure for cellular call leg 2. When timer 128 expires, allowing data buffered in the cellular network to run out, controller 120 switches the call through to the Wi-Fi leg and sends the SIP ACK message to dual-mode phone 300 via WI-FI controller 130. This switching is performed as before by changing the NAT bindings of the RTP data streams associated with the call legs.

While the invention has been described in terms of several embodiments, the invention should not be limited to only those embodiments described, but can be practiced with modification and alteration within the spirit and scope of the appended claims. The description is this to be regarded as illustrative rather than limiting.

What is claimed is:

1. A non-transitory computer readable medium comprising instructions which, when executed by one or more hardware processors, causes performance of operations comprising:

receiving an indication that a multi-mode phone is within a radio frequency range of an access point supporting a Wi-Fi network;

establishing a Wi-Fi connection between the access point and the multi-mode phone while the multi-mode phone is on a call via a cellular connection;

starting a timer for a predetermined time period while the multi-mode phone is on the call via the cellular connection;

switching the call from the cellular connection to the Wi-Fi connection when the timer expires.

2. The medium of claim 1, where establishing the Wi-Fi connection comprises:

a controller initiating the Wi-Fi connection through a wireless network.

3. The medium of claim 1 where switching the call from the cellular connection to the Wi-Fi connection comprises:

changing NAT bindings of at least one RTP data stream associated with the call.

4. The medium of claim 1 where the call is directed to a controller by a SIP PBX.

5. The medium of claim 1 where the multi-mode phone initiates a release procedure for the cellular connection when the Wi-Fi connection is established.

6. The medium of claim 1 wherein the timer reduces duplicated data by allowing completed transmission of data in a first buffer corresponding to the cellular connection.

7. The medium of claim 1 wherein data buffered, during the predetermined time period, in a cellular network that provides the cellular connection is transmitted via the cellular connection.

8. The medium of claim 1 wherein an amount of data buffered, during the predetermined time period, in a cellular network that provides the cellular connection is greater than an amount of data buffered in a wireless network that provides the Wi-Fi connection.

9. The medium of claim 1 wherein during the predetermined time period both the Wi-Fi connection and the cellular connection are active and the call is routed through the cellular connection.

10. The medium of claim 1 wherein a controller routes the call through the cellular connection during the predetermined time period when both the wireless connection and the cellular connection are active.

11. A system comprising:

at least one device including a hardware processor;

the system being configured to perform operations comprising:

receiving an indication that a multi-mode phone is within a radio frequency range of an access point supporting a Wi-Fi network, establishing a Wi-Fi connection between the access point and the multi-mode phone while the multi-mode phone is on a call via a cellular connection;

starting a timer for a predetermined time period while the multi-mode phone is on the call via the cellular connection;

switching the call from the cellular connection to the Wi-Fi connection when the timer expires.

12. The system of claim 11, where establishing the Wi-Fi connection comprises:

a controller initiating the Wi-Fi connection through a wireless network.

13. The system of claim 11 where switching the call from the cellular connection to the Wi-Fi connection comprises:

changing NAT bindings of at least one RTP data stream associated with the call.

14. The system of claim 11 where the call is directed to a controller by a SIP PBX.

15. The system of claim 11 where the multi-mode phone initiates a release procedure for the cellular connection when the Wi-Fi connection is established.

16. The system of claim 11 wherein the timer reduces duplicated data by allowing completed transmission of data in a first buffer corresponding to the cellular connection.

17. The system of claim 11 wherein data buffered, during the predetermined time period, in a cellular network that provides the cellular connection is transmitted via the cellular connection.

18. The system of claim 11 wherein an amount of data buffered, during the predetermined time period, in a cellular network that provides the cellular connection is greater than an amount of data buffered in a wireless network that provides the Wi-Fi connection.

19. The system of claim 11 wherein during the predetermined time period both the Wi-Fi connection and the cellular connection are active and the call is routed through the cellular connection.

20. The system of claim 11 wherein a controller routes the call through the cellular connection during the predetermined time period when both the wireless connection and the cellular connection are active.

* * * * *